(12) United States Patent
Okuda et al.

(10) Patent No.: US 9,741,987 B2
(45) Date of Patent: Aug. 22, 2017

(54) ACCUMULATOR DEVICE

(71) Applicant: KABUSHIKI KAISHA TOYOTA JIDOSHOKKI, Kariya-shi, Aichi-ken (JP)

(72) Inventors: Motoaki Okuda, Kariya (JP); Atsushi Minagata, Kariya (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 0 days.

(21) Appl. No.: 14/782,338

(22) PCT Filed: Apr. 1, 2014

(86) PCT No.: PCT/JP2014/059645
§ 371 (c)(1),
(2) Date: Oct. 5, 2015

(87) PCT Pub. No.: WO2014/168046
PCT Pub. Date: Oct. 16, 2014

(65) Prior Publication Data
US 2016/0064714 A1    Mar. 3, 2016

(30) Foreign Application Priority Data

Apr. 9, 2013  (JP) .................................. 2013-081248

(51) Int. Cl.
*H01M 2/16* (2006.01)
*H01M 2/18* (2006.01)
(Continued)

(52) U.S. Cl.
CPC .......... *H01M 2/1673* (2013.01); *H01G 11/52* (2013.01); *H01M 2/18* (2013.01);
(Continued)

(58) Field of Classification Search
None
See application file for complete search history.

(56) References Cited

U.S. PATENT DOCUMENTS

2009/0092900 A1* 4/2009 Obana ................... H01M 2/166
429/223
2012/0028100 A1* 2/2012 Maeda ..................... H01M 2/16
429/139
(Continued)

FOREIGN PATENT DOCUMENTS

JP         7-302616 A    11/1995
JP      2002-252023 A     9/2002
(Continued)

OTHER PUBLICATIONS

International Preliminary Report on Patentability of PCT/JP2014/059645, dated Oct. 13, 2015.
International Search Report of PCT/JP2014/059645, dated Jul. 8, 2014. [PCT/ISA/210].

*Primary Examiner* — Jonathan Crepeau
(74) *Attorney, Agent, or Firm* — Sughrue Mion, PLLC

(57) ABSTRACT

An electricity storage device includes a first electrode sheet, separators, and a second electrode sheet. The separators each include primary protrusions, which are located on the opposite sides of the first electrode sheet and protrude from the first electrode sheet, and secondary protrusions, which are located on the opposite sides of the first electrode sheet and protrude from the first electrode sheet in a direction different from the protrusion direction of the primary protrusions. The primary protrusions are welded to each other in a first weld region, and the secondary protrusions are welded to each other in a second weld region. The region width of the first weld region in the protrusion direction of the primary protrusions is greater than the region width of the second weld region in the protrusion direction of the secondary protrusions.

6 Claims, 2 Drawing Sheets

(51) Int. Cl.
  *H01G 11/52*     (2013.01)
  *H01M 10/04*     (2006.01)
  *H01M 10/0525*   (2010.01)
  *H01M 10/34*     (2006.01)

(52) U.S. Cl.
  CPC ... *H01M 10/0413* (2013.01); *H01M 10/0436* (2013.01); *H01M 10/0525* (2013.01); *H01M 10/345* (2013.01); *H01M 2/1646* (2013.01); *H01M 2/1686* (2013.01); *H01M 2220/20* (2013.01); *Y02E 60/13* (2013.01); *Y02T 10/7022* (2013.01)

(56) References Cited

U.S. PATENT DOCUMENTS

2015/0099154 A1* 4/2015 Okuda .................... H01M 2/18
                                                        429/142
2015/0140401 A1* 5/2015 Minagata ............... H01G 11/52
                                                        429/139

FOREIGN PATENT DOCUMENTS

| JP | 2008-91100   | A |   | 4/2008  |
|----|--------------|---|---|---------|
| JP | 2008-269819  | A |   | 11/2008 |
| JP | 2009-123582  | A |   | 6/2009  |
| JP | 2009-224102  | A |   | 10/2009 |
| JP | 2011-76838   |   | * | 4/2011  |
| JP | 2012-33399   | A |   | 2/2012  |
| JP | 2013-251206  | A |   | 12/2013 |

* cited by examiner

ACCUMULATOR DEVICE

CROSS REFERENCE TO RELATED APPLICATIONS

This application is a National Stage of International Application No. PCT/JP2014/059645, filed Apr. 1, 2014, claiming priority based on Japanese Patent Application No. 2013-081248, filed Apr. 9, 2013, the contents of all of which are incorporated herein by reference in their entirety.

TECHNICAL FIELD

The present invention relates to an electricity storage device.

BACKGROUND ART

Lithium-ion rechargeable batteries and nickel metal hydride rechargeable batteries are well-known electricity storage devices installed in electric vehicles (EVs) and plug-in hybrid vehicles (PHVs). Patent Document 1 discloses an example of an electricity storage device that includes an electrode assembly formed by layering electrode sheets. Each electrode sheet includes metal foil and active metal layers formed on surfaces of the metal foil. Separators are located between the electrode sheets.

In Patent Document 1, two separators sandwich a rectangular positive electrode sheet. The sections of the separators that protrude beyond the four edges of the positive electrode sheet in in-plane directions are heat welded (thermally fused) to form weld regions. In the electricity storage device of Patent Document 1, each positive electrode sheet is thus positioned relative to separators. In addition, positive electrode sheets, which are covered by separators, and negative electrode sheets are layered so that electrode sheets with different sizes are layered face-to-face.

PRIOR ART DOCUMENTS

Patent Documents

Patent Document 1: Japanese Laid-Open Patent Publication No. 2002-252023

SUMMARY OF THE INVENTION

Problems that the Invention is to Solve

When covered by separators, a positive electrode sheet of Patent Document 1 is located on the center sections of the separators, with the edges of the positive electrode sheet separated by an equal distance from the corresponding outer edges of the separators. The region width of the weld region corresponding to the edge of the positive electrode sheet that includes a collector tab is equal to the region width of the weld regions corresponding to the other edges of the positive electrode sheet.

Thus, in Patent Document 1, if the protrusion amount of the separators beyond the edge including the collector tab is increased to avoid short circuit between negative electrode sheets and collector tabs of positive electrode sheets, the narrow region width of the weld region may cause defects in the separators, such as creases or bends, when electrode sheets are layered.

Such defects in separators may result in non-uniform distances or binding force between electrode sheets that are adjacent in the lamination direction of the electrode assembly, which may decrease the performance, such as capacitance, of the electricity storage device.

It is an objective of the present invention to provide an electricity storage device that reduces defects in separators in an electrode assembly including layered separators and electrode sheets.

Means for Solving the Problems

To achieve the foregoing objective and in accordance with one aspect of the present invention, an electricity storage device is provided that includes a first electrode sheet, separators, and a second electrode sheet. The first electrode sheet includes two surfaces and an active material layer, which is located on at least one of the two surfaces. The separators cover the two surfaces of the first electrode sheet. The second electrode sheet includes two surfaces and an active material layer, which is located on at least one of the two surfaces. The second electrode sheet differs from the first electrode sheet in polarity. The first electrode sheet, the separators, and the second electrode sheet are layered to form an electrode assembly. The first electrode sheet includes a first edge and a tab, which extends from the first edge. The separators each include primary protrusions and secondary protrusions. The primary protrusions are located on opposite sides of the first electrode sheet and protrude beyond the first electrode sheet in an extension direction of the tab. The secondary protrusions are located on the opposite sides of the first electrode sheet and protrude beyond the first electrode sheet in a direction that differs from a protrusion direction of the primary protrusions. The primary protrusions are welded to each other in a primary weld region. The secondary protrusions are welded to each other in a secondary weld region. The primary weld region has a region width in the protrusion direction of the primary protrusions that is greater than a region width of the secondary weld region in a protrusion direction of the secondary protrusions.

MODES FOR CARRYING OUT THE INVENTION

An electricity storage device according to one embodiment will now be described.

Figure 1:
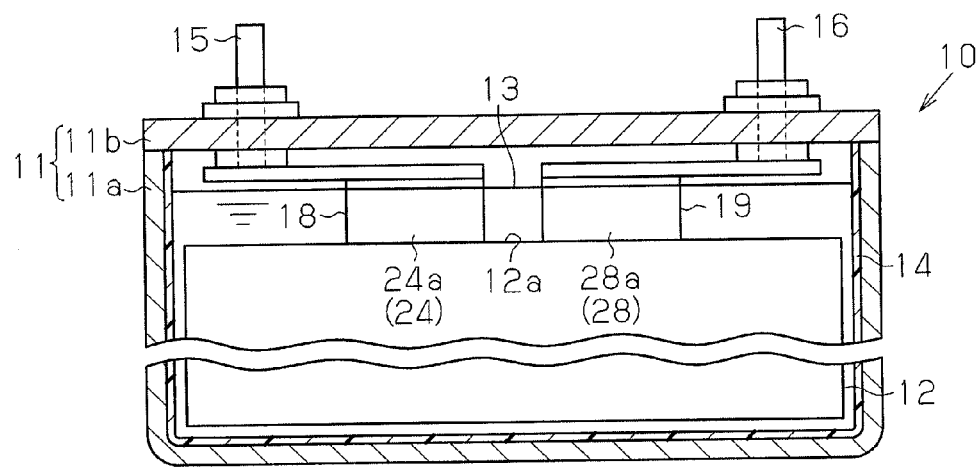
FIG. 1 is a schematic cross-sectional view of a lithium-ion rechargeable battery according to one embodiment.

As shown in FIG. 1, a lithium-ion rechargeable battery 10 (hereinafter referred to as "rechargeable battery"), which is an electricity storage device installed in a vehicle, such as a passenger vehicle or an industrial vehicle, includes an electrode assembly 12 and a case 11, which accommodates the electrode assembly.

The case 11 includes a body 11a, which accommodates the electrode assembly 12 and has the shape of a rectangular box, and a lid 11b, which closes the opening of the body 11a and has the shape of a rectangular plate. The body 11a and the lid 11b are made of metal, such as stainless steel or aluminum.

The case 11 is filled with a non-aqueous electrolyte solution 13, which is an electrolyte. A positive terminal 15 and a negative terminal 16 project outward from the lid 11b. The electrode assembly 12 is covered by an insulative plastic sheet 14 and accommodated in the case 11.

Figure 2:
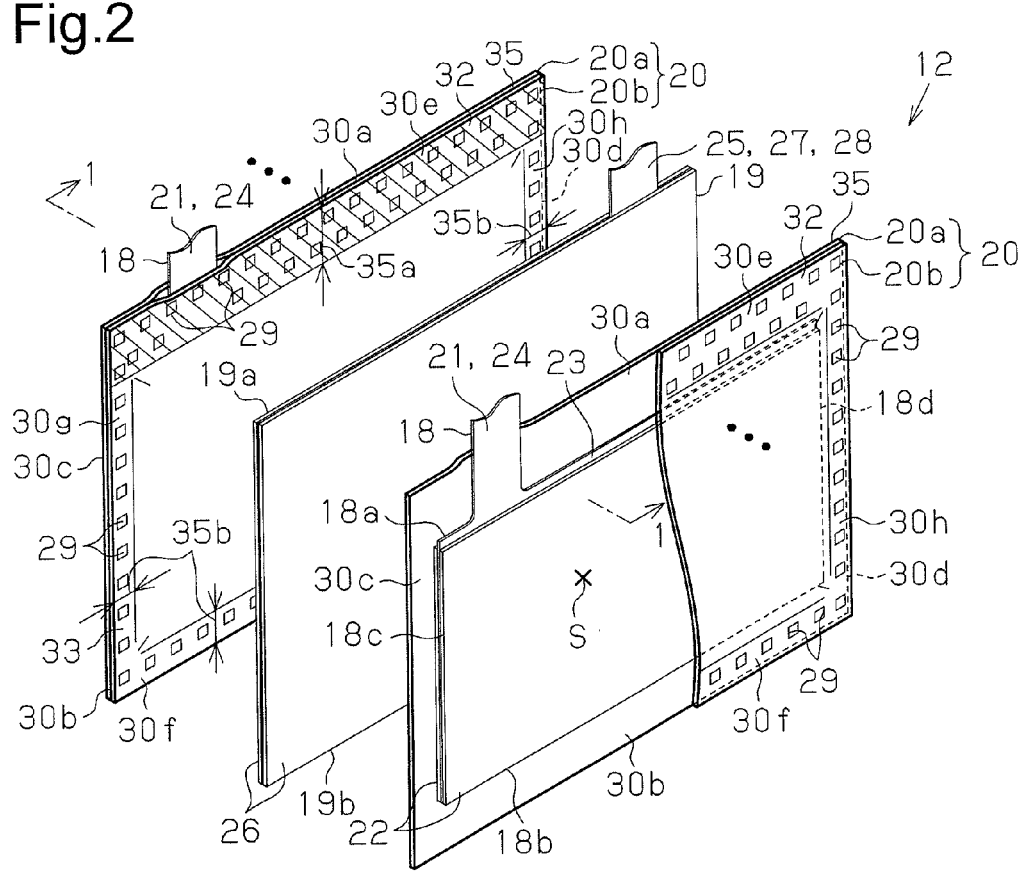
FIG. 2 is a schematic perspective view showing an electrode assembly accommodated in the rechargeable battery of FIG. 1.

As shown in FIG. 2, the electrode assembly 12 includes positive electrode sheets 18, negative electrode sheets 19, which differ from the positive electrode sheets 18 in polarity, and pouch-shaped electrode accommodating separators 20, which insulate the positive electrode sheets 18 from the negative electrode sheets 19. The positive electrode sheet 18 is also referred to as a positive electrode or a first electrode sheet, and the negative electrode sheet 19 is also referred to as a negative electrode or a second electrode sheet. Each positive electrode sheet 18 includes a first positive electrode edge 18a and a second positive electrode edge 18b, which is opposite to the first positive electrode edge 18a. Each negative electrode sheet 19 includes a first negative electrode edge 19a and a second negative electrode edge 19b, which is opposite to the first negative electrode edge 19a. The first positive electrode edge 18a of the positive electrode sheet 18 is also referred to as a first edge, and the first negative electrode edge 19a of the negative electrode sheet 19 is also referred to as a second edge.

The electrode assembly 12 is a laminated electrode assembly in which the electrode accommodating separators 20, which accommodate the positive electrode sheets 18, and the negative electrode sheets 19 are layered alternately. In the following descriptions, the lamination direction refers to the direction in which the positive electrode sheets 18 and the negative electrode sheets 19 are layered in the electrode assembly 12.

Each positive electrode sheet 18 includes positive metal foil 21 (aluminum foil in the present embodiment), which has a rectangular outer shape, and positive active material layers 22, which are located on opposite surfaces of the positive metal foil 21 and include an active material (a positive active material). On each surface of the positive metal foil 21, the positive active material layer 22 extends from the second positive electrode edge 18b of the positive electrode sheet 18 with a fixed width and extends over the entire dimension of the positive electrode sheet 18 in the extension direction of the first positive electrode edge 18a.

Further, each surface of the positive metal foil 21 includes a positive electrode non-forming section 23, in which the positive active material layer 22 is not formed. The positive electrode non-forming section 23 extends from the first positive electrode edge 18a with a fixed width and extends over the entire dimension of the first positive electrode edge 18a. The positive electrode non-forming section 23 extends along the first positive electrode edge 18a and serves as a metal foil exposed section, in which the positive metal foil 21 is exposed.

Each positive electrode sheet 18 includes a positive collector tab 24, which serves as a first tab and extends (projects) from the first positive electrode edge 18a. The positive collector tab 24 is a part of the positive metal foil 21, which forms the positive electrode non-forming section 23. All the positive electrode sheets 18, which are components of the electrode assembly 12, have respective positive collector tabs 24, which are identical in shape and located in the same position.

As shown in FIG. 1, the electrode assembly 12 includes an edge section 12a, on which a positive collector tab group 24a is located. The positive collector tab group 24a serves as a first tab group and is formed by collecting all the positive collector tabs 24 of the electrode assembly 12. The positive collector tabs 24 are layered in the positive collector tab group 24a. The positive collector tab group 24a is electrically connected to the positive terminal 15 by welding, for example.

As shown in FIG. 2, each negative electrode sheet 19 includes negative metal foil 25 (copper foil in the present embodiment), which has a rectangular outer shape, and negative active material layers 26, which are located on opposite surfaces of the negative metal foil 25 and include an active material (negative active material). On each surface of the negative metal foil 25, the negative active material layer 26 extends from the first negative electrode edge 19a to the second negative electrode edge 19b of negative electrode sheet 19 and extends over the entire dimension of the first negative electrode edge 19a.

The negative electrode sheet 19 includes a negative collector tab 28, which extends (projects) from the first negative electrode edge 19a. The negative collector tab 28 of the present embodiment serves as a second tab that extends in the same direction as the positive collector tab 24. The negative collector tab 28 is a negative electrode non-forming section 27 in which the negative active material layer 26 is not formed. The negative collector tab 28 is also a metal foil exposed section in which the negative metal foil 25 is exposed.

All the negative electrode sheets 19, which are components of the electrode assembly 12, include respective negative collector tabs 28, which are identical in shape and located in the same position. The negative collector tabs 28 are positioned so as not to overlap with the positive collector tabs 24 when the positive electrode sheets 18 and the negative electrode sheets 19 are layered.

As shown in FIG. 1, a negative collector tab group 28a, which is a second tab group and is formed by collecting all the negative collector tabs 28 of the electrode assembly 12, is located on the edge section 12a of the electrode assembly 12. The negative collector tabs 28 are layered in the negative collector tab group 28a. The negative collector tab group 28a is electrically connected to the negative terminal 16 by welding, for example.

As shown in FIG. 2, each electrode accommodating separator 20 includes a first separator 20a and a second separator 20b, which face each other. The first and second separators 20a and 20b are rectangular sheets and are made of macroporous film.

The first separator 20a and the second separator 20b are identical in shape and size and larger than the positive electrode sheet 18. Thus, the first separator 20a includes a protrusion 30a that protrudes in the extension direction of the positive collector tab 24 beyond the first positive electrode edge 18a of the positive electrode sheet 18, from which the positive collector tab 24 projects, when the first separator 20a is placed over the positive electrode sheet 18. Likewise, the second separator 20b includes a protrusion 30e that protrudes beyond the first positive electrode edge 18a in the same direction as the protrusion 30a when the second separator 20b is placed over the positive electrode sheet 18. The protrusions 30a and 30e have the same protrusion width. In the present embodiment, the protrusions 30a and 30e function as primary protrusions that protrude in the extension direction of the positive collector tab 24 on the opposite sides of the positive electrode sheet 18.

The first separator 20a also includes a protrusion 30b that protrudes beyond the second positive electrode edge 18b, which is opposite to the first positive electrode edge 18a, a protrusion 30c that protrudes beyond a third positive electrode edge 18c, and a protrusion 30d that protrudes beyond a fourth positive electrode edge 18d. The third and fourth positive electrode edges 18c and 18d are perpendicular to the first and second positive electrode edges 18a and 18b. Likewise, the second separator 20b includes protrusions 30f, 30g and 30h that protrude beyond the second positive electrode edge 18b, the third positive electrode edge 18c, and the fourth positive electrode edge 18d, respectively. The protrusions 30b to 30d and 30f to 30h have the same protrusion width.

The protrusions 30b and 30f protrude in the direction opposite to the extension direction of the positive collector tab 24. The protrusions 30c, 30d, 30g and 30h protrude in directions perpendicular to the extension direction of the positive collector tab 24. That is, the protrusions 30b to 30d and 30f to 30h extend in directions that differ from the extension direction of the positive collector tab 24. In the present embodiment, the protrusions 30b, 30c and 30d and the protrusions 30f, 30g, and 30h serve as secondary protrusions, which protrude in directions that differ from the protrusion direction of the protrusions 30a and 30e.

In each electrode accommodating separator 20, the protrusions 30a and 30e are joined to each other in a primary weld region 32, in which weld sections 29 formed by heat welding are provided at intervals. In the present embodiment, as indicated by the diagonally shaded area in FIG. 2, the entire surfaces (or substantially the entire surfaces) of the protrusions 30a and 30e are the primary weld region 32.

In a similar manner, in the electrode accommodating separator 20, the protrusions 30b to 30d of the first separator 20a are joined to the protrusions 30f to 30h of the second separator 20b in secondary weld regions 33, in which weld sections 29 formed by heat welding are provided at intervals. In the present embodiment, the entire surfaces (or substantially the entire surfaces) of the protrusions 30b to 30d and 30f to 30h are the secondary weld regions 33.

Accordingly, the secondary weld regions 33 have the same region width 35b in the protrusion directions of the protrusions 30b to 30d and 30f to 30h. The region width 35a of the primary weld region 32 in the extension direction of the positive collector tab 24 is greater than the region width 35b of the secondary weld regions 33.

The first separator 20a and the second separator 20b are welded (joined) at all sides. The positive collector tab 24 of the positive electrode sheet 18 extends between the opposed protrusions 30a and 30e of the first and second separators 20a and 20b and projects beyond the distal edge 35 of the electrode accommodating separator 20 (the separators 20a and 20b). The electrode accommodating separator 20, which is formed by joining the first separator 20a and the second separator 20b to each other, includes an accommodation section S for the positive electrode sheet 18 inside the weld regions 32 and 33.

The electrode accommodating separator 20 (the separators 20a and 20b) and the negative electrode sheet 19 have the same (or substantially the same) dimension in the direction in which the first positive electrode edge 18a of the positive electrode sheet 18 and the first negative electrode edge 19a of the negative electrode sheet 19 extend. The dimension of the electrode accommodating separator 20 (the separators 20a and 20b) in the extension direction of the collector tabs 24 and 28 is greater than the dimension of the negative electrode sheet 19 in the same direction.

In the electrode assembly 12, the electrode accommodating separators 20, which accommodate the positive electrode sheets 18, and the negative electrode sheets 19 are layered such that the second negative electrode edges 19b of the negative electrode sheets 19 and the edges of the electrode accommodating separators 20 that are opposite to the distal edges 35 are in alignment when viewed in the lamination direction.

Figure 3:
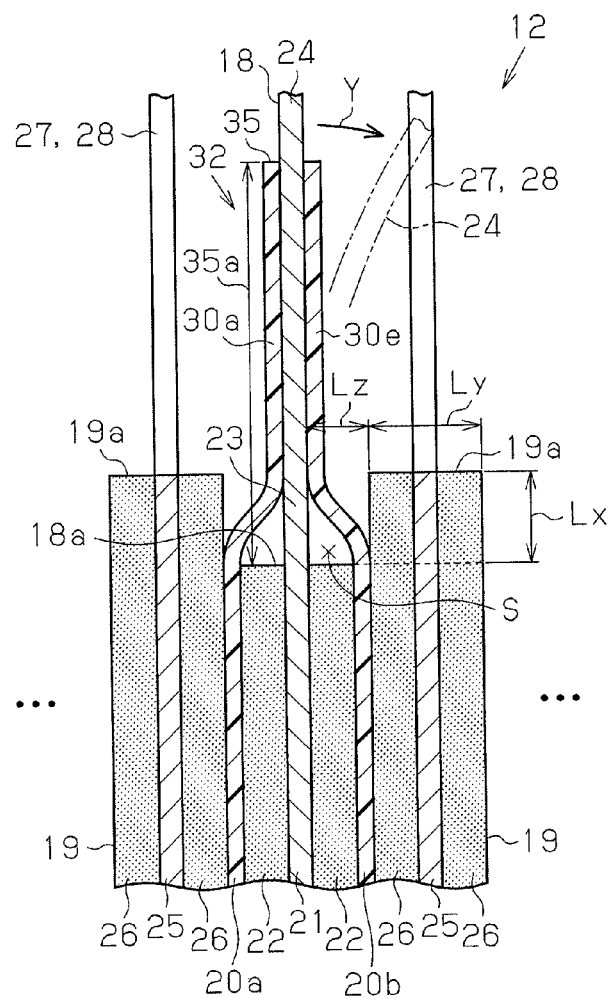
FIG. 3 is a cross-sectional view taken along line 1-1 in FIG. 2.

Thus, as shown in FIG. 3, the first negative electrode edge 19a of the negative electrode sheet 19 projects beyond the first positive electrode edge 18a in the extension direction of the positive collector tab 24. Accordingly, when viewed in the lamination direction, the first negative electrode edge 19a is located between the first positive electrode edge 18a of the positive electrode sheet 18 and the distal edge 35 in the protrusion direction of the protrusions 30a and 30e. That is, the first negative electrode edge 19a overlaps the primary weld region 32 when viewed in the lamination direction. Further, in the electrode assembly 12, the positive electrode sheets 18 (the positive active material layers 22), excluding the positive collector tabs 24, are entirely overlapped by the negative active material layers 26 of the negative electrode sheets 19 when viewed in the lamination direction.

The region width 35a of the primary weld region 32 in the extension direction of the positive collector tab 24 is greater than or equal to the sum of the distance Lx between the edge surface of the first positive electrode edge 18a and the edge surface of the first negative electrode edge 19a in the extension direction of the positive collector tab 24, the thickness Ly of the negative electrode sheet 19, and the distance Lz between the positive collector tab 24 of the positive electrode sheet 18 and the negative electrode sheet 19, which is adjacent to the positive electrode sheet 18.

Ceramic layers, which are formed of insulative ceramic particles, cover the entire outer surfaces of the separators 20a and 20b, which are opposite to the inner surfaces that face the positive electrode sheet 18. The inner surfaces of the separators 20a and 20b are not covered by ceramic layers.

Next, operation of the rechargeable battery 10 of the present embodiment will be described.

The region width 35a of the primary weld region 32 in the extension direction of the positive collector tab 24 is greater than the region width 35b of the secondary weld regions 33. This allows the primary weld region 32 to have a larger area for fixing the separators 20a and 20b to each other than the secondary weld regions 33. Thus, when the positive electrode sheets 18, which are accommodated in the electrode accommodating separators 20, and the negative electrode sheets 19 are layered, the protrusions 30a and 30e are less likely to be separated, by peeling off, for example, from each other and form creases or bends.

In particular, the primary weld region 32 of the present embodiment extends over the entire surfaces (or substantially the entire surfaces) of the protrusions 30a and 30e. This further limits separation of the protrusions 30a and 30e.

The region width 35a of the primary weld region 32 is greater than or equal to the sum of the distance Lx between the edge surface of the first positive electrode edge 18a and the edge surface of the first negative electrode edge 19a, the thickness Ly of the negative electrode sheet 19, and the distance Lz between the positive collector tab 24 and the negative electrode sheet 19.

Accordingly, when the positive collector tabs 24 are bent and collected in the lamination direction to form the positive collector tab group 24a as indicated by arrow Y in FIG. 3, the section of each positive collector tab 24 that can be brought into contact with the adjacent negative electrode sheet 19 is covered by the electrode accommodating separator 20, in which the protrusions 30a and 30e are fixed to each other.

The weld sections 29 are provided at intervals in the primary weld region 32 and the secondary weld regions 33. This limits shrinkage of the separators 20a and 20b in heat welding, while maintaining the areas of the weld regions 32 and 33, compared to a structure in which a weld section 29 extends over the entire area of the weld regions 32 and 33 or a structure in which weld sections 29 are formed continuously.

The outer surfaces of the separators 20a and 20b, which form the electrode accommodating separators 20, are entirely covered by ceramic layers. This limits shrinkage of the separators 20a and 20b even if the temperature of the rechargeable battery 10 exceeds the heat shrinkage temperature or melting point of the electrode accommodating separators 20 (the separators 20a and 20b).

The inner surfaces of the separators 20a and 20b are not covered by ceramic layers. This allows for heat welding of the separators 20a and 20b in the primary weld region 32 and the secondary weld regions 33, facilitating the formation of the weld sections 29.

The electrode accommodating separators 20 accommodate the positive electrode sheets 18. Thus, the positive electrode sheets 18 can be easily positioned relative to the negative electrode sheets 19 by positioning the electrode accommodating separators 20 relative to the negative electrode sheets 19. In the present embodiment in particular, the positive electrode sheets 18 are positioned such that the positive electrode sheets 18 (the positive active material layers 22), excluding the positive collector tabs 24, are entirely overlapped by the negative active material layers 26 of the negative electrode sheets 19 when viewed in the lamination direction. This advantageously limits precipitation of lithium in charging and discharging.

The advantages of the present embodiment will now be described.

(1) The region width 35a of the primary weld region 32 is greater than the region width 35b of the secondary weld regions 33. This limits separation of the separators 20a and 20b in the primary weld region 32, which sandwiches the positive collector tab 24. Thus, defects in the protrusions 30a and 30e, such as creases or bends, are less likely to occur when the positive electrode sheets 18, which are accommodated in the electrode accommodating separators 20, and the negative electrode sheets 19 are layered. This reduces defects in the separators 20a and 20b of the electrode assembly 12, in which the separators 20a and 20b, the positive electrode sheets 18, and the negative electrode sheets 19 are layered.

(2) The sections of the positive collector tabs 24 that can be brought into contact with the negative electrode sheets 19 are covered by the electrode accommodating separators 20, in which the protrusions 30a and 30e are fixed to each other. This limits short circuit between the positive collector tabs 24 of the positive electrode sheets 18 and the negative electrode sheets 19 when the positive collector tabs 24 are collected to form the positive collector tab group 24a.

(3) The weld sections 29 are provided at intervals in the weld regions 32 and 33. This limits shrinkage of the separators 20a and 20b compared to a structure in which the weld sections 29 are formed continuously in the weld regions 32 and 33.

(4) The insulative ceramic layers of the separators 20a and 20b limit shrinkage of the separators 20a and 20b, which would otherwise be caused by a temperature rise. This reduces short circuit between the positive electrode sheets 18 and the negative electrode sheets 19.

(5) The ceramic layers cover the outer surfaces that are opposite to the surfaces that face the positive electrode sheet 18. This allows for heat welding of the first and second separators 20a and 20b, facilitating the fixation of the separators 20a and 20b.

(6) In the rechargeable battery 10, defects in the separators 20a and 20b of the electrode assembly 12 are reduced. This limits degradation in the performance of the rechargeable battery 10, such as decreased capacitance, caused by non-uniform distances or binding force between the positive electrode sheets 18 and the negative electrode sheets 19 in the lamination direction of the electrode assembly 12.

The present invention is not limited to the above described embodiment, but may be embodied as follows, for example.

Figure 4:
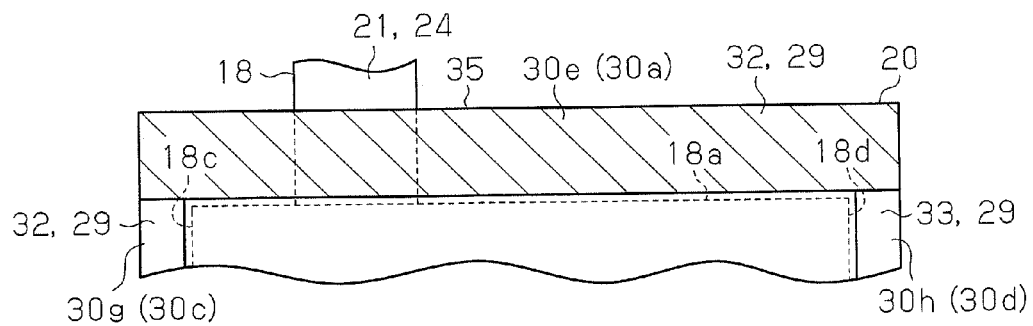
FIG. 4 is a schematic front view showing an electrode accommodating separator according to another embodiment.

As shown in FIG. 4, a single weld section 29 may be formed in the entire primary weld region 32. For example, a linear, continuous weld section 29 may be formed. The secondary weld region 33 may also be modified in a similar manner.

The electrode accommodating separators 20 may accommodate the negative electrode sheets 19 instead of the positive electrode sheets 18.

The first separator 20a and the second separator 20b may be formed integrally. That is, the electrode accommodating separator 20 may be formed by folding a single separator sheet in half and forming the weld regions 32 and 33 by heat welding.

Each positive electrode sheet 18 may include a plurality of positive collector tabs 24 extending from the first positive electrode edge 18a. That is, the electrode assembly 12 may include a plurality of positive collector tab groups 24a projecting from the edge section 12a. The negative electrode sheet 19 may also be modified in a similar manner.

The protrusions 30b and 30f, the protrusions 30c and 30g, and the protrusions 30d and 30h may differ in protrusion width. The protrusion width of the protrusions 30b and 30f, the protrusions 30c and 30g, and the protrusions 30d and 30h may be equal to or greater than the protrusion width of the protrusions 30a and 30e. However, as with the above illustrated embodiment, the region width 35a of the primary weld region 32 should be greater than the region width 35b of the secondary weld regions 33.

The primary weld region 32 may be located in a part of each of the protrusions 30a and 30e. Likewise, the secondary weld region 33 may be located in a part of each of the protrusions 30b and 30f, the protrusions 30c and 30g, and the protrusions 30d and 30h.

The region width 35a of the primary weld region 32 may be less than the sum of the distance Lx, the thickness Ly, and the distance Lz. Nevertheless, the structure of the above illustrated embodiment is desirable to limit short circuit between the positive collector tabs 24 of the positive collector tab group 24a and the negative electrode sheets 19.

Ceramic layers may cover the inner surfaces of the separators 20a and 20b in addition to the outer surfaces. Ceramic layers may cover only parts of the outer surface of the separators 20a and 20b.

Each of the separators 20a and 20b may have a multilayer structure in which microporous films cover the opposite sides of the ceramic layer.

The metal of the positive metal foil 21 and the negative metal foil 25 may be changed.

The positive electrode sheet 18 may include the positive active material layer 22 only on one surface. The negative electrode sheet 19 may include the negative active material layer 26 only on one surface.

The present embodiment may be embodied in other electricity storage devices, such as a nickel metal hydride rechargeable battery or an electric double layer capacitor.

The present invention may be embodied in an electricity storage device used for applications other than vehicles.

The invention claimed is:

1. An electricity storage device comprising:
a first electrode sheet including two surfaces and an active material layer, which is located on at least one of the two surfaces;
a separator, which covers the two surfaces of the first electrode sheet; and
a second electrode sheet, which includes two surfaces and an active material layer, which is located on at least one of the two surfaces, wherein the second electrode sheet differs from the first electrode sheet in polarity, wherein
the first electrode sheet, the separator, and the second electrode sheet are layered to form an electrode assembly,
the first electrode sheet includes a first edge and a tab, wherein the tab projects in an extension direction away from the first edge,
the separator includes:
   a pair of primary protrusions, which is located on opposite sides of the first electrode sheet and protrudes beyond the first electrode sheet in a protrusion direction that is the same direction as the extension direction of the tab; and
   a plurality of pairs of secondary protrusions, wherein each pair of the secondary protrusions is located on the opposite sides of the first electrode sheet and protrudes beyond the first electrode sheet in a protrusion direction that differs from the protrusion direction of the pair of the primary protrusions and the protrusion directions of the other pairs of the secondary protrusions,
the pair of the primary protrusions includes a separator edge, which projects beyond the first edge in the extension direction of the tab, and covers the tab such that the tab is not exposed to the outside of the separator over an area from the first edge to the separator edge,
the primary protrusions in the pair are welded to each other in a primary weld region,
the secondary protrusions in each pair are welded to each other in a secondary weld region,
the primary weld region has a region width in the protrusion direction of the pair of the primary protrusions that is greater than a region width of each of the secondary weld regions in protrusion directions of the corresponding pair of the secondary protrusions, and
the second electrode sheet includes a second edge that projects beyond the first edge of the first electrode sheet in the extension direction of the tab of the first electrode sheet, and
the region width of the primary weld region is greater than or equal to a sum of:
   a distance between the first edge and the second edge in the extension direction of the tab of the first electrode sheet;
   a thickness of the second electrode sheet; and
   a distance between the tab of the first electrode sheet and the second electrode sheet, which is adjacent to the first electrode sheet.

2. The electricity storage device according to claim 1, wherein at least one of the primary weld region and the secondary weld regions includes a plurality of heat weld sections that are provided at intervals.

3. The electricity storage device according to claim 1, wherein
the separator includes a first separator, which covers one of the two surfaces of the first electrode sheet, and a second separator, which covers the other of the two surfaces of the first electrode sheet, and
at least one of the first separator and the second separator includes an insulative ceramic layer.

4. The electricity storage device according to claim 3, wherein the ceramic layer covers a surface opposite to a surface that faces the first electrode sheet in the at least one of the first separator and the second separator.

5. The electricity storage device according to claim 1, wherein the first electrode sheet has a positive polarity.

6. The electricity storage device according to claim 1, wherein the electricity storage device is a rechargeable battery.

* * * * *